Aug. 2, 1966    J. T. BARTON    3,263,296
TROWEL FOR PIPE LINING MATERIAL
Filed June 9, 1965    2 Sheets-Sheet 1
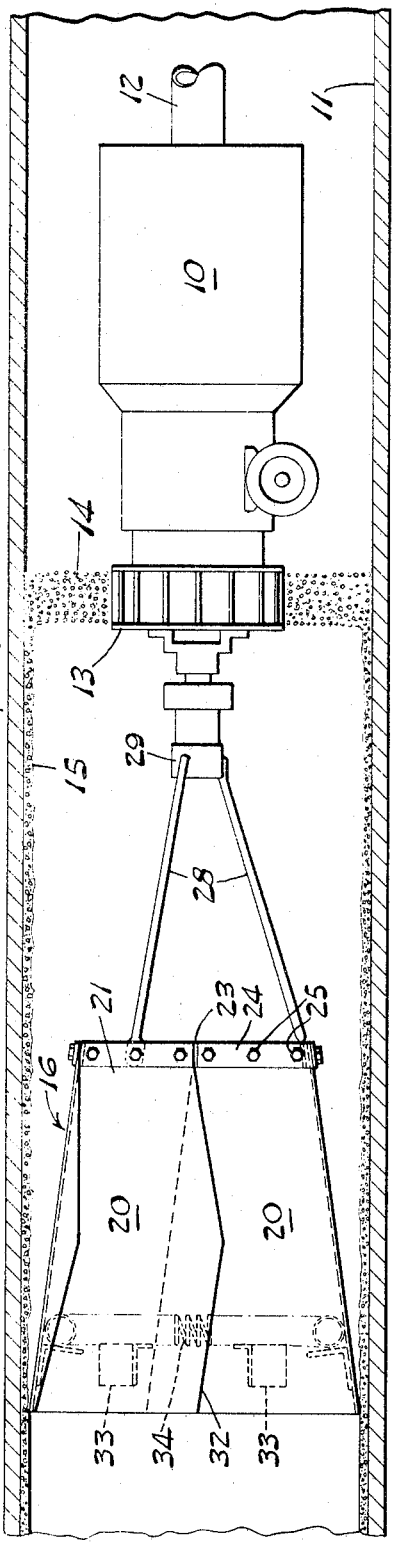
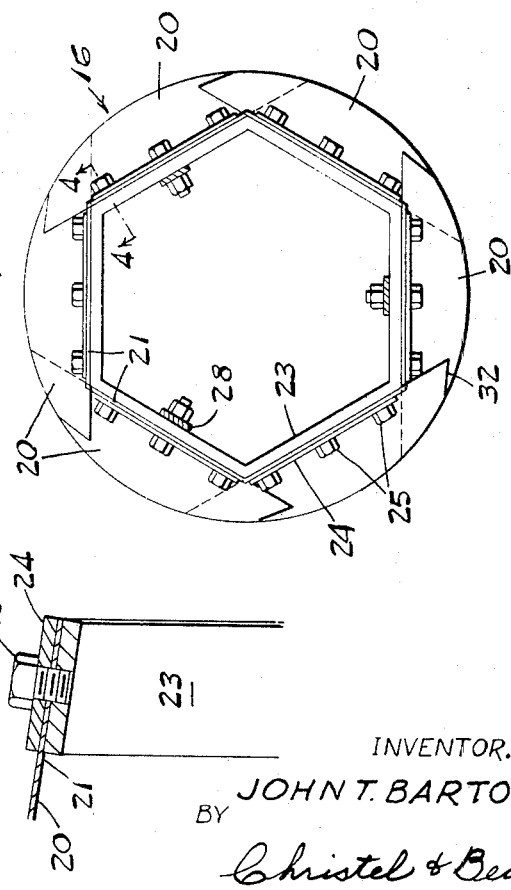
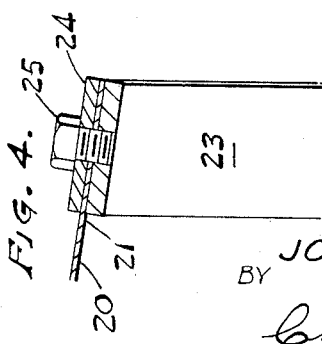
INVENTOR.
JOHN T. BARTON
BY
Christel & Bean
ATTORNEYS Aug. 2, 1966 J. T. BARTON 3,263,296
TROWEL FOR PIPE LINING MATERIAL
Filed June 9, 1965 2 Sheets-Sheet 2
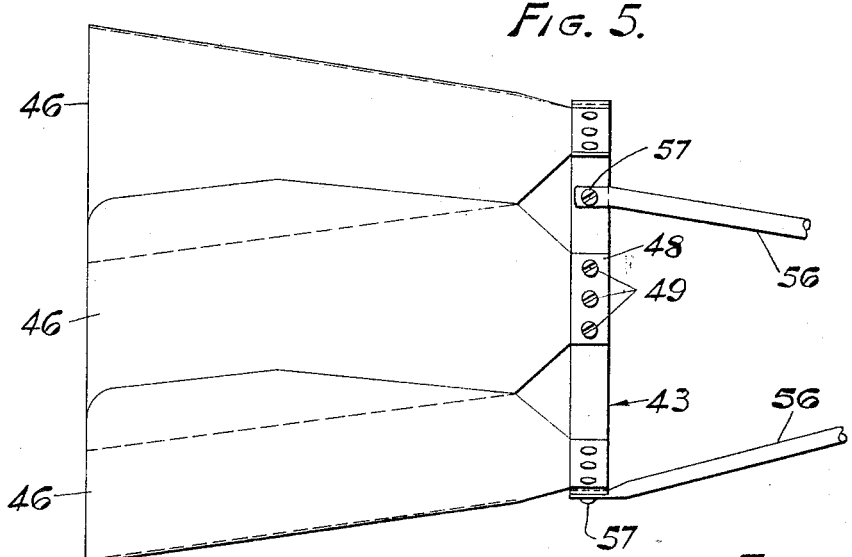
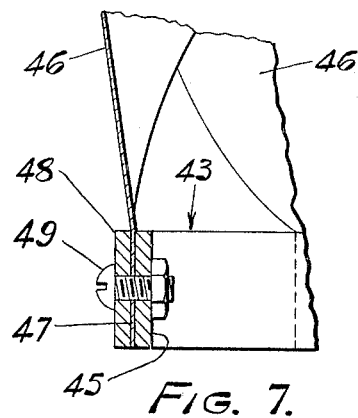
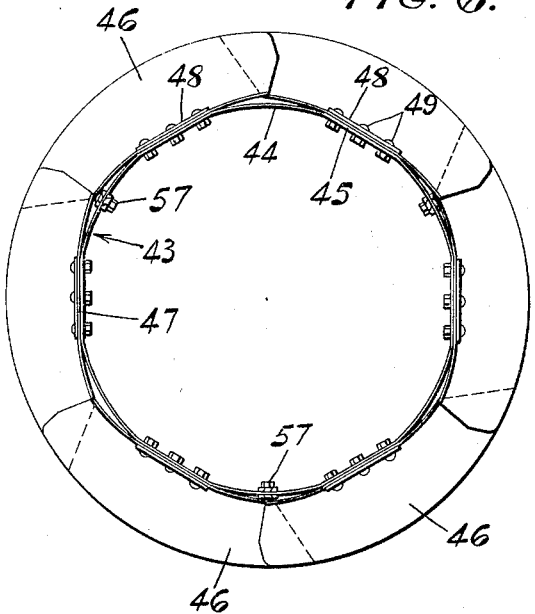
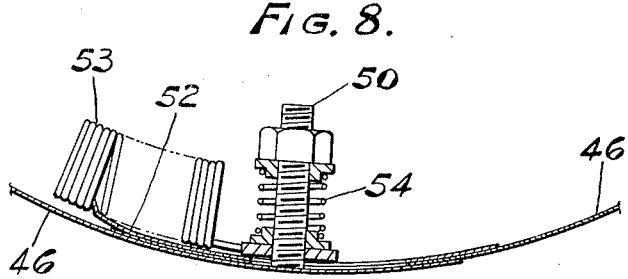
INVENTOR.
JOHN T. BARTON
BY
*Christel & Bean*
ATTORNEYS United States Patent Office 3,263,296
Patented August 2, 1966

3,263,296
TROWEL FOR PIPE LINING MATERIAL
John T. Barton, Montour Falls, N.Y., assignor to Perkins Pipe Linings, Inc., Grand Island, N.Y.
Filed June 9, 1965, Ser. No. 462,644
7 Claims. (Cl. 25—38)

This application is a continuation-in-part of my co-pending application Serial No. 321,770, filed November 6, 1963, now abandoned. This invention relates generally to apparatus for applying a protective coating of mortar or like material to the inner walls of pipe lines, conduits and the like, and more particularly to troweling devices for performing the final smoothing operation of such lining materials immediately after they have been applied to the interior wall of a pipe or the like.

Apparatus for applying a lining of mortar or similar plastic material to the interior of pipe lines in place in the ground is well known and generally comprises a machine which travels through the pipe being lined while distributing a coating of lining material to the interior of the pipe by centrifugal action.

Speaking generally, the type of troweling device with which the present invention is concerned is in the shape of a conical frustum having its small end connected to the pipe lining machine to be drawn through thereby with its large end engaging the circular layer of mortar which has been deposited against the interior of the pipe by the lining machine so as to trowel and smooth the same. These trowels are known in the art as "drag trowels." Examples of troweling devices of this general type are found in the patents to Warren E. Perkins No. 2,924,-867, dated February 16, 1960; No. 2,987,794, dated June 13, 1961; and No. 3,105,282, dated October 1, 1963.

Trowels of this type comprise one or more sheet metal members which are bent to form an open ended conical frustum and the trowel of the present invention relates more particularly to trowels of this type wherein several sheet metal plates combine to form such a conical frustum, each plate extending longitudinally from the small to the large end of the trowel with the plates overlapping along their lateral edges.

The small ends of trowel devices of this type may have a fixed diameter and usually are provided with means for connection to a pipe lining machine which draws the trowel through the pipe following the application of mortar thereto. However, the large end of a trowel of this type, which is the portion that performs the actual troweling function, must have qualities of resilience to provide for diametral expansion and contraction.

Since the sheet metal plate portions of a trowel of this type are arcuate in transverse cross-section, they normally have substantially no flexibility along their lengths. It has accordingly been customary to provide one or another kind of movable mounting means for the small ends of such trowels whereby the leaves may move bodily outwardly and inwardly to increase or decrease the vertex angle of the cone which defines the external surface of the trowel device.

The trowel of the present invention provides a multi-leaved frusto-conical trowel structure in which the several plates may be fixed to a solid mounting block at the small ends of such plates and in which the outer portions of the plates which define the larger end of the trowel are arcuately curved to define the desired conical frustum. This is accomplished by arranging the trowel plates and the mounting block therefor in such a way that the plates at the leading or small end of the trowel are relatively flat transversely and accordingly flexible in a longitudinal direction to provide the necessary capability of resilient diametral expansion and contraction at the large end of the trowel.

Since this is accomplished with a simple rigid mounting block requiring no flexibility and performing no resilient function, it is obvious that a very simple and effective trowel structure is provided. The necessary flexing movements of the trowel are integrated within the trowel plates themselves. In the forms shown herein by way of example, internal spring means are provided for urging the trowel plates flexibly outwardly against the surface to be troweled.

Two specific embodiments of the principles of the present invention are illustrated in the accompanying drawings and described in detail in the following specification. However, it is to be understood that such embodiments are by way of example only and that various mechanical modifications may be introduced without departing from the spirit of the invention, the scope of which is limited only as defined in the appended claims.

In the drawings:

FIG. 1 is a longitudinal cross-sectional view through a pipe being lined by a pipe lining apparatus having in combination therewith a trowel element or component constructed in accordance with one form of the present invention;

FIG. 2 is an end elevational view of the troweling element of FIG. 1 viewed from the left-hand side of FIG. 1, that is, from the trailing end of the troweling element;

FIG. 3 is an end elevational view of the troweling element of FIG. 1, viewed from the right-hand end, that is, the leading end of the troweling element;

FIG. 4 is a fragmentary cross-sectional view taken generally on the line 4—4 of FIG. 2;

FIG. 5 is an elevational view similar to FIG. 1 showing another embodiment of a trowel element or component constructed in accordance with the present invention;

FIG. 6 is an end elevational view of the troweling element of FIG. 5 viewed from the right hand or leading end thereof;

FIG. 7 is a fragmentary cross-sectional view on the line VII—VII of FIG. 5; and

FIG. 8 is a fragmentary end elevational view of the trowel of FIG. 5 taken from the left-hand or leading end thereof.

The apparatus for applying the coating material to the interior of the pipe as a plastic mix in the form of mortar or the like is well known in the present art and the details thereof shall be referred to only to the extent required to properly orient the troweling means relative thereto, the troweling means per se comprising the particular subject matter of the present invention. Referring to FIG. 1, the numeral 10 designates a pipe lining machine which may be of the type illustrated and described in United States Letters Patent No. 2,758,352, the machine 10 being adapted to be drawn through a subterranean pipe 11 by a remote winch and cable means or the like, the movement of the machine 10 being to the right as viewed in FIG. 1 during pipe lining operation thereof.

Mortar is fed to machine 10 through a flexible conduit 12 and merely by way of example is applied to the interior surface of the pipe by a rotary distributor head 13 which discharges the mortar centrifugally as indicated at 14 to apply a more or less rough coating of mortar 15 to the interior of pipe 11. The thickness of the coating is governed by the rate of discharge from distributor head 13 and the rate of movement of the machine through the pipe.

The embodiment of the frusto-conical troweling element itself shown in FIGS. 1 through 4 is designated generally by the numeral 16 and is connected to the pipe lining machine 10 at its leading end to follow the same through the pipe being lined. The means by which the troweling element 16 is connected to the pipe lining machine proper or to any other desired draft means is not novel to the present application and may be generally as shown in any of the aforesaid Perkins trowel patents. The troweling element 16 in the embodiment being described comprises six overlapping trowel plates which together form the generally frusto-conical element 16, the plates being designated 20 in FIGS. 1 through 4.

Each trowel plate 20 is arcuate in transverse cross section throughout most of its length but has a flat portion 21 at its smaller end, the right hand end as viewed in the drawing. The radius of the transversely arcuate portion varies progressively so that such arcuate portion comprises a portion of the surface of a cone. Toward the right hand end of each trowel plate 20 the arcuate portion preferably merges smoothly into the flat end portion 21.

The numeral 23 designates a mounting member for the trowel plates which in the present instance is generally in the form of a hexagonal frame lying across the axis of movement of the trowel. In the present embodiment the six outer surfaces of frame 23 are at an angle to the direction of movement of the trowel, such angle being substantially the same as the angle of divergence of the trowel plates proper. In other words, if a longitudinal line were drawn medially along each trowel plate it would lie in the same plane as the corresponding outer flat angular surface of frame 23.

However, it must be noted that this condition will only obtain when the trowel plates are in an unstressed condition, whereas when the trowel is fully assembled the plates are flexed outwardly by spring means at the large end of the trowel, as will presently be described. The condition shown in FIG. 1 represents a condition which would only exist when the inward pressure of mortar against the trowel plates presses the plates radially inwardly against the outward force of the expanding spring means within the large end of the trowel to a particular degree.

The flat end portion 21 of each trowel plate 20 is disposed against one of the flat outer surfaces of frame 23 and held securely by a plate member 24 and three screws 25 which thread into the frame 23. Certain of the middle screws, in the present instance three, extend radially inwardly and provide means for attaching the ends of rods 28 which are fastened at their opposite ends to a coupling 29 whereby the trowel is attached to the trailing end of the pipe lining machine.

Thus attached, the six trowel plates overlap as shown to form a conical frustum. To accentuate and insure the desired trailing action of the exposed edges of the overlapping end portions of the trowel plates 20 at the large end, such edges are cut to form angles as indicated at 32 in FIG. 1, the large end portion of the troweling element 16 being the portion which is in contact with the mortar during troweling.

Resilient means are provided for urging the trailing portions of the trowel plates 20 outwardly while permitting them to deflect radially inwardly under pressure of mortar thereagainst and under pressure of various obstructions which may be encountered. As shown in FIGS. 1 and 2, each trowel plate 20 has an angle clip 33 welded to its interior surface adjacent to the large end of the trowel. A continuous circularly extending compression coil spring 34 lies against the interior surfaces of the trowel plates 20, being retained against axially outward movement relative to trowel 16 by the clips 33.

The embodiment illustrated in FIGS. 5 through 8 is substantially the same as that of the first-described embodiment in construction and operation. As far as the present invention is concerned the sole difference is in the construction of the supporting frame which is designated 23 in the first embodiment. In FIGS. 5, 6 and 7 this supporting frame is designated generally 43 and differs essentially from the frame 23 of FIGS. 2 and 4 in the fact that the outer surfaces of frame 43 are not at an angle but extend parallel to the longitudinal axis of the trowel.

While the frame 43 is essentially hexagonal for receiving six trowel plates, the corners thereof are rounded off as shown at 44 in FIG. 6, there being six intermediate flat portions 45 for receiving the mounting portions of trowel plates in essentially the same manner as in the previously described embodiment. The six trowel plates of FIGS. 5 through 8 are designated 46 and are essentially the same in outline as the trowel plates 20 of the previous embodiment, excepting that they happen to overlap in the opposite direction.

As in the previous embodiment, each trowel plate 46 has a flat portion 47 at its smaller end, the right hand end as viewed in FIG. 5, and is of arcuate cross section throughout most of the remainder of its length, whereby the several overlapping trowel plates form a frusto-conical trowel body. The flat end portion 47 of each trowel plate 46 is held against a flat outer surface portion 45 of frame 43 by a plate member 48 and three bolt and nut connections 49.

In general the individual trowel plates are so formed that the flat portions 47 are mere straight line continuations of the longitudinal mid portions of the transversely curved portions of the trowel plates 46. Thus the individual plates are held in the outwardly flexed, conically-extending position shown particularly in FIG. 7 by expansion spring means disposed within the large end of the trowel.

The expansion means may be the same as that shown in FIG. 3 of the previous embodiment but in this instance is of a type shown in Perkins Patent No. 3,188,710, dated June 15, 1965. As shown in FIG. 8, the outer overlapping portion of a trowel plate 46 has a stud 50 welded or brazed thereto which projects radially inwardly through a circumferentially extending slot in the inner underlapping portion of the adjacent trowel plate and through a similar slot in a clip 52 which is attached to the interior of such overlapping portion, as in the aforesaid Patent No. 3,188,710.

An extension coil spring 53 acts between the left hand end of clip 52 and stud 50, tending resiliently to cause the overlapping trowel portions to slide in an expanding direction. A compression coil spring designated 54 in FIG. 8 resiliently urges the overlapping trowel plate portions radially toward each other, likewise as in Patent No. 3,188,710.

From the foregoing it will be seen that in each of the described embodiments a frusto-conical trowel is provided wherein the several plates which make up the troweling surface are relatively flexible at their base or root portions, whereby the plates may be rigidly attached to the mounting member while still possessing the necessary freedom to expand and contract during troweling operations under the opposing pressures of the expanding spring means, on the one hand, and the external forces exerted by mortar surface or various obstructions, on the other hand.

It is to be understood that the metal sheets forming the trowel plates in the two described embodiments are relatively thin so as to conform readily in curvature upon expanding and contracting movements. In a ten inch trowel, for instance, and merely by way of example, resilient steel .0075″ thick is currently employed. However, even with such relatively thin material the arcuate transverse cross section of the main body portions of the trowel plates renders these arcuate portions of the trowel plates substantially inflexible with respect to flexure about axes transverse to the axis of the cone formed by the trowel plates.

While both embodiments herein include means acting within the large ends of the trowels for resiliently expanding the same, trowels of the kind contemplated in the present invention may omit the extraneous or auxiliary expanding means in the large ends of the trowels, reliance being had upon the resilience of the material itself in the flat area immediately adjacent to the mounting portion. In such cases slightly heavier trowel plate material may be required and the individual trowel plates will be formed so that in an unstressed condition they form a frusto-conical trowel body substantially larger than the diameter to be troweled. Thus pressure of mortar against the outsides of the large ends of the trowel plates will force such ends radially inwardly by flexure of the trowel plates across the flat areas immediately adjacent to the mounting member and against the natural resilience offered by the sheet material forming such flat areas of the trowel plates.

In such cases the individual trowel plates may be initially bent along transverse lines immediately adjacent to the mounting member so that the arcuate portions of the trowels flare conically outwardly at a sufficient angle to form a trowel wherein the large end is of substantially greater diameter than the surface to be troweled, whereby the material of the trowel plates themselves at the transverse lines of flexure thereof affords sufficient natural resilience to provide the desired degree of troweling pressure.

By thus initially bending the trowel plates substantially outwardly, sufficient stress is set up in the trowel plates in the region of the transverse bend lines when the trowel plate is compressed to introduce the same into a pipe to be troweled, to establish a resilient outward troweling pressure.

In FIG. 5 rods 56 are shown which correspond to the traction rods 28 of the previous embodiment, rods 56 being pivoted to frame 43 as at 57.

What is claimed is:

1. Trowel means for smoothing a layer of plastic lining material in an interior generally cylindrical surface, said trowel means comprising a plurality of longitudinally extending plate members which combine to form a generally frusto-conical trowel body having a small leading end and a larger trailing end, the portions of said plate members adjacent to the small end of the trowel body being substantially flat and the remaining portions of said plate members being arcuate in transverse cross section and of a progressively increasing radius toward the large end of the trowel body with such arcuate portions in laterally overlapping relation to form said frusto conical body, and a central mounting member at the small end of said trowel body having polygonally arranged outer surface portions, said flat portions of said plate members being fixed against said mounting member surface portions, the flat portions of said plate members adjacent to said mounting member permitting flexure of said plate members about transverse axes whereby the diameter of the large end of the frusto-conical trowel body may readily expand and contract by relative intersliding movement of said overlapping arcuate portions, and resilient means within the large end of the trowel body to exert a perimeter-increasing force at said larger end for resiliently urging the plate members radially outwardly to urge said larger end into yieldable troweling contact with said lining material.

2. Trowel means for smoothing a layer of plastic lining material in an interior generally cylindrical surface, said trowel means comprising a plurality of longitudinally extending plate members having qualities of resilience to provide for diametral expansion and contraction, said plate members combining to form a generally frusto-conical trowel body having a small leading end and a larger trailing end, the portions of said plate members adjacent to the small end of the trowel body being substantially flat and the remaining portions of said plate members being arcuate in transverse cross section and of a progressively increasing radius toward the large end of the trowel body with such arcuate portions in laterally overlapping relation to form said frusto-conical body, and a central mounting member at the small end of said trowel body having polygonally arranged outer surface portions, said flat portions of said plate members being fixed against said mounting member surface portions, the flat portions of said plate members adjacent to said mounting member permitting resilient flexure of said plate members about transverse axes whereby the diameter of the large end of the frusto-conical trowel body may yield diametrically inwardly by relative intersliding movement of said overlapping portions when the trowel is drawn through a cylindrical member having plastic material applied to its interior surface, the free diameter of the larger end of said trowel body being substantially greater than the troweling diameter.

3. Trowel means for smoothing a layer of plastic lining material in an interior generally cylindrical surface, said trowel means comprising a plurality of longitudinally extending plate members which combine to form a generally frusto-conical trowel body having a small leading end and a larger trailing end, the portions of said plate members adjacent to the small end of the trowel body being substantially flat and the remaining portions of said plate members being arcuate in transverse cross section and of a progressively increasing radius toward the large end of the trowel body with such arcuate portions in laterally overlapping relation to form said frusto-conical body, and a central mounting member at the small end of said trowel body having flat mounting surface portions, said flat portions of said plate members being fixed against said mounting member surface portions, the flat portions of said plate members adjacent to said mounting member permitting flexure of said plate members about transverse axes whereby the diameter of the large end of the frusto-conical trowel body may readily expand and contract by relative intersliding movement of said overlapping arcuate portions, and resilient means within the large end of the trowel body to exert a perimeter-increasing force at said larger end for resiliently urging the plate members radially outwardly to urge said larger end into yieldable troweling contact with said lining material.

4. Trowel means for smoothing a layer of plastic lining material in an interior generally cylindrical surface, said trowel means comprising a plurality of longitudinally extending plate members having qualities of resilience to provide for diametral expansion and contraction, said plate members combining to form a generally frusto-conical trowel body having a small leading end and a larger trailing end, the portions of said plate members adjacent to the small end of the trowel body being substantially flat and the remaining portions of said plate members being arcuate in transverse cross section and of a progressively increasing radius toward the large end of the trowel body with such arcuate portions in laterally overlapping relation to form said frusto-conical body, and a central mounting member at the small end of said trowel body having flat mounting surface portions, said flat portions of said plate members being fixed against said mounting member surface portions, the flat portions of said plate members adjacent to said mounting member permitting resilient flexure of said plate members about transverse axes whereby the diameter of the large end of the frusto-conical trowel body may yield diametrally inwardly by relative intersliding movement of said overlapping portions when the trowel is drawn through a cylindrical member having plastic material applied to its interior surface, the free diameter of the larger end of said trowel body being substantially greater than the troweling diameter.

5. Trowel means for smoothing a layer of plastic lining material in an interior generally cylindrical surface, said trowel means comprising a plurality of longitudinally extending plate members having qualities of resilience to provide for diametral expansion and contraction, said plate members combining to form a generally frusto-conical trowel body, the portions of said plate members adjacent to the small end of the trowel body being flat and the remaining portions thereof being arcuate in transverse cross section and in laterally overlapping relation whereby such remaining portions form said frusto-conical body, the flat portion of each plate being substantially co-planar with a medial longitudinal line along the arcuate portion thereof, and a polygonal mounting member at the small end of said trowel body having a number of sides corresponding to the number of said plate members and comprising flat housing surfaces, said flat portions of said plate members being fixed against said mounting member surfaces, the flat portions of said plate members adjacent to said mounting member permitting flexure in a longitudinal direction whereby the diameter of the large end of the trowel body may expand and contract, the free diameter of the larger end of said trowel body being substantially greater than the troweling diameter.

6. Trowel means for smoothing a layer of plastic lining material in an interior generally cylindrical surface, said trowel means comprising a plurality of longitudinally extending plate members having qualities of resilience to provide for diametral expansion and contraction, said plate members combining to form a generally frusto-conical trowel body, the portion of each of said plate members adjacent to the small end of the trowel body being substantially flat and the remaining portion thereof being arcuate in transverse cross section and in laterally overlapping relation whereby such remaining portions of the several plates form said frusto-conical body, each of said flat portions being substantially co-planar with a medial longitudinal line along said arcuate portion, and a central mounting member at the small end of said trowel body having flat mounting surfaces, said flat portions of said plate members being fixed against said mounting member surfaces, the flat portions of said plate members permitting flexure in a longitudinal direction whereby the diameter of the large end of the trowel body may expand and contract, the free diameter of the larger end of said trowel body being substantially greater than the troweling diameter.

7. Trowel means for smoothing a layer of plastic lining material in an interior generally cylindrical surface, said trowel means comprising a plurality of longitudinally extending plate members which combine to form a generally frusto-conical trowel body adapted to be drawn axially along said interior cylindrical surface small end first, the portions of said plate members adjacent to the large end of said body being arcuate in transverse cross section and of a progressively increasing radius toward said large end and laterally overlapping to form a frusto-conical troweling portion, the ends of said plates adjacent to the small end of said trowel being rigidly attached to a support means, said plates having transversely flat portions adjacent to their rigidly attached portions and between such attached portions and the transversely curved portions of said plates to form flexible hinge connections between said attached portions and said transversely curved portions, whereby the angle of divergence of said frusto-conical troweling portion may increase and decrease by flexure of said hinge connections, so that the large end of the trowel body may readily expand and contract under varying troweling conditions, means within the large end of the trowel body to exert a perimeter-increasing force at said large end for resiliently urging the plate members radially outwardly to urge said large end into yieldable troweling contact with said lining material.

References Cited by the Examiner

UNITED STATES PATENTS 1,612,842  1/1927   Thompson et al. _____ 15—104.18
2,924,867  2/1960   Perkins _____ 25—38

J. SPENCER OVERHOLSER, *Primary Examiner.*

G. A. KAP, *Assistant Examiner.*